HULL, ALEURONE AND ENDOSPERM
210 X

ENDOSPERM
210 X

June 14, 1949.    D. W. HANSEN    2,472,971
MANUFACTURE OF CORN PRODUCTS
Filed Nov. 7, 1945    3 Sheets-Sheet 3

Fig. 4

INVENTOR
BY Donald W. Hansen,
Cromwell, Greist & Warden
Attys.

Patented June 14, 1949

2,472,971

UNITED STATES PATENT OFFICE 2,472,971

MANUFACTURE OF CORN PRODUCTS

Donald W. Hansen, Decatur, Ill., assignor to A. E. Staley Manufacturing Co., Decatur, Ill., a corporation of Delaware Application November 7, 1945, Serial No. 627,275

5 Claims. (Cl. 127—68)

This invention relates to improvements in the manufacture of corn products. More particularly, it pertains to a novel procedure for dehulling and decapping corn kernels preparatory to removing the embryos from the endosperms, or degerminating, combined with related improvements primarily involving the recovery of starch, the separate recovery of the aleurone portion, or the manufacture of "white goods," as desired, preferably by a wet milling process, although the invention also embodies a dry milling process.

Generally, the manufacture of corn products involves steeping of whole corn kernels in dilute sulfurous acid to loosen the embryos, or germs, removing the same in degerminating mills, and separating the embryos from the kernels by flotation. The kernels are then ground in stone mills to free the starch and gluten from the hulls, tip caps and cellulosic cell walls surrounding the starch granules. The starch and gluten is washed from the resulting grits by a series of screens and bolting silks. The starch is then separated from the gluten by settling or by the use of special centrifugal machines. There are many difficulties and disadvantages which accompany such a process because of the presence of the fibrous hulls and tip caps which increases the amount of grinding necessary for a complete separation of the starch and gluten. Much washing and screening is necessary to obtain yields of the order of 93.5 per cent of the starch in the corn. The remaining fraction of 6.5 per cent of the starch is lost in the mixture of corn hulls, tip caps, aleurone layers and endosperm cell walls and some of the embryos which make up the coarse and fine grits. In accordance with the principles of the present invention, this unrecovered fraction of starch can materially be reduced.

A principal object of the present invention is the provision of a process for dehulling and decapping corn kernels prior to degermination in order more quickly, efficiently and economically to recover increased yields of starch, as well as increased yields of other by-products ordinarily recovered from corn.

More specifically, an object of the invention is to provide a process for the manufacture of starch from corn kernels by subjecting them to the action of a dilute heated aqueous solution of caustic alkali for a period of time that is very short compared to the duration of ordinary steeping but sufficiently long to permit the alkali to loosen the hulls and tip caps and to penetrate to the aleurone layer only, but without detaching the aleurone from the endosperm, the aleurone acting as a barrier to protect the endosperm against further effective attack by the alkali; dehulling and decapping the kernels; steeping the resulting aleurone coated endosperms to soften them and thereafter removing the embryos; grinding the remaining endosperms and then recovering the aleurone cell layer particles, fine grits, gluten, and starch.

Another object of the invention is the prior removal of hulls and tip caps from corn kernels to facilitate ready removal and separate recovery of the aleurone portion from the degerminated endosperms.

A further object of the invention is the prior removal of the hulls and tip caps from corn kernels to permit finer grinding of the endosperms and thus facilitate recovery of the aleurone portions and insure better separation of starch and gluten.

Still another object of the invention is the prior removal of hulls and tip caps from corn kernels before degerminating to provide endosperms to be milled into white goods, such as, for example, corn meal, corn flour, grits, etc., containing aleurone material, but free from hulls, tip caps, germs and other constituents of the kernel.

It is also an object of this invention generally to improve processes dealing preferably with the wet milling of corn, as well as processes involving dry milling of corn, by the elimination of various conventional steps and accompanying apparatus necessary to perform such steps, and to improve the quality and quantity of the various end products recovered.

Other objects of the invention will in part be obvious and will in part appear hereinafter.

The invention accordingly comprises the several steps and the relation and order of one or more of such steps with respect to each of the others thereof, which will be exemplified in the process hereinafter disclosed, and the scope of the application of which will be indicated in the claims.

For a fuller understanding of the nature and objects of the invention reference should be had to the following detailed description, taken in connection with the accompanying drawings, in which:

Fig. 4 is a flow sheet illustrating the present invention.

Figure 1:
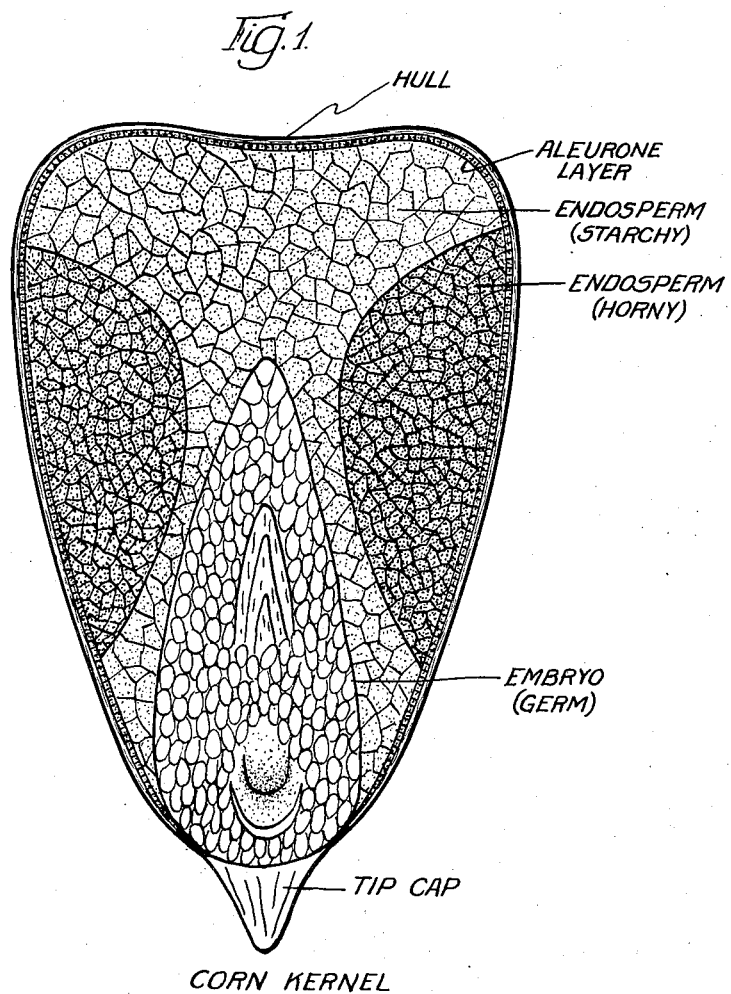
Fig. 1 is an enlarged cross sectional view taken through a corn kernel illustrating the hull, aleurone layer, the tip cap, the endosperm (starchy), the endosperm (horny) and the embryo (germ)

Referring now to Fig. 1 of the drawings, it will be seen that the tip cap is located at the tip end of the kernel of corn. It constitutes approximately 1.5 per cent of the weight of the corn kernel, contains 8.8 per cent protein, and 2.3 per cent oil. The remainder is essentially cellulose and xylan. Practically no starch is present.

The hull is a thin outer coating which covers the entire kernel except in the area of attachment of the tip cap. The hull constitutes approximately 5.9 per cent of the weight of the corn kernel, contains 4.0 per cent protein, and 0.9 per cent oil. The remainder is essentially cellulose and xylan, and practically no starch is present in the hull.

Underneath the hull is a single layer of coarse, tough, highly suberized and water-resistant cells, called the aleurone layer, which covers the entire kernel except at the bottom position of the embryo. The aleurone cells constitute approximately 1.7 per cent of the weight of the corn kernel, and also contain no starch. The cells contain 23 per cent of protein, approximately 20 per cent of fatty material, and some ash.

The endosperm, which constitutes the major portion of the kernel, and the embryo are within these outer coverings. The endosperm consists of cells of very thin cellulosic walls. Each cell is filled with a large number of starch granules embedded in the gluten. The endosperm constitutes approximately 79.9 per cent of starch. The balance is made up of a small amount of fatty material and of the thin cellulosic cell walls.

The embryo, or germ, occupies a position at the tip end of the kernel and adjacent one of the sides. It consists of cells filled with oil and protein and a small amount of starch. The embryo constitutes 11 per cent of the weight of the corn kernel and contains approximately 50 per cent of oil and 16 per cent of protein. The starch content may vary, ranging from 2 to 5 per cent.

Figure 2:
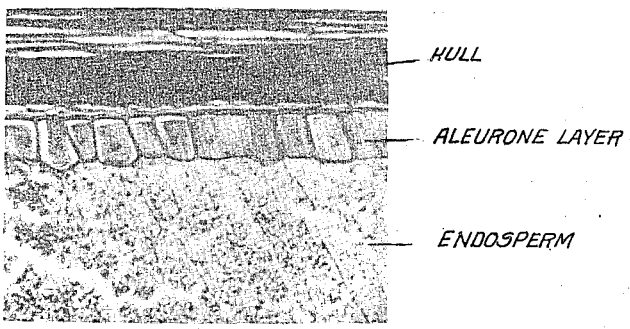
Fig. 2 is a fragmentary cross sectional view taken through an outer section of a corn kernel and enlarged 210 times, showing the hull, aleurone layer, and endosperm.
Figure 3:
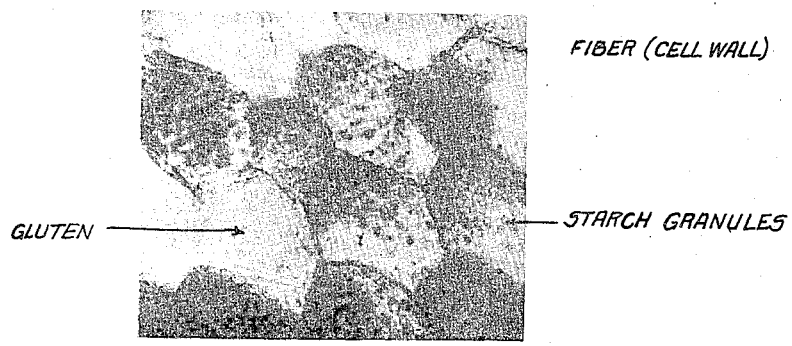
Fig. 3 is a fragmentary cross sectional view taken through an inner section of a corn kernel and enlarged 210 times, showing the fibers (cell walls) of an endosperm, the starch granules confined within each surrounding cell wall structure, and the gluten in which is embedded the starch granules.

From this distribution of parts and their percentage composition, the advantages of removing the substantially starch-free, protein-free and oil-free hull and tip cap as an initial step in the manufacture of corn products will now more fully be appreciated, particularly since these parts present obstacles to the maximum recovery of starch and other products if they are not previously removed. Figs. 2 and 3 are photomicrographs of the various tissues described above.

Wet milling process

Referring more particularly to the flow sheet illustrated in Fig. 4 of the drawings, there is set forth a preferred sequence of steps illustrating a type of wet milling process as contemplated by the present invention. Shelled corn, after being passed through cleaners consisting, for example, of screens to remove dirt, dust, etc., is subjected to the action of an aqueous solution of caustic alkali, for example, preferably sodium hydroxide, or potassium hydroxide, having a concentration of at least 0.2 per cent, for a very short period of time, for example, between 2 to 10 minutes, and which is heated to a temperature of about 130° F. to boiling. In any event, the conditions and materials involving this alkali treatment should be such as to permit the hulls and tip caps quickly to become loosened from underlying layers of aleurone cells without permitting the latter to become separated from the endosperms. This prevents the caustic solution from penetrating the aleurone layers, thereby protecting the endosperms against any undesirable action of the alkali. The alkaline liquor can be next drained off and the materials washed if desired in any suitable manner. It is important that the hulls and tip caps, as well as the endosperms, should not be gelatinized or excessively softened by the treatment so as to interfere with subsequent dehulling and milling operations. The conditions of pH, time and temperature therefore are important. For example, a time of treatment not exceeding 60 minutes, but preferably up to and including 15 minutes, is contemplated, and at a temperature lying within the range of about 100° F. to the boiling point of the solution.

The next step, that of freeing the hulls and tip caps from the kernels, can be performed in any suitable manner which effectively will dehull and decap the kernels. Under suitable conditions any properly equipped conventional dehulling and decapping machine can be used. A machine especially designed for this purpose forms the subject matter of a divisional application. It has been found that the type and speed of the impeller of the agitator, and the character of the surface of the impeller, together with the inner sides of the container, all have a profound effect upon the efficiency of the dehulling process. The impeller should have no hard, sharp leading edges. The same applies to splash boards or other structures within the tank since such edges tend to fracture the crown of the kernel of corn and set free the starch contained therein. The parts of any such device useful for dehulling and decapping the kernels in a water solution preferably are covered with some soft material such as, for example, rubber. A modified Beall degerminator or a modified Bauer attrition mill, could be used with lower power requirements and a lower ratio of water to corn.

After the kernels have been dehulled and decapped, they are ready for the next step in the process, namely, that of separating the hulls and tip caps from the endosperms and this preferably is carried out in a hydraulic separator. For example, a shallow trough about 6 inches in height can be used wherein the mixture of hulls, tip caps and endosperms are fed into one end thereof accompanied by a flow of water. The rate of flow of water should be sufficient to carry the hull and the tip caps to the surface and then allow the endosperms to remain on the bottom. The endosperms can be moved to the opposite end of the trough by a drag chain or screw conveyor which at the same time turns the corn over so that any hulls or tip caps embedded in the mass of corn have an opportunity to rise to the surface. The separator should be so constructed that the major portion of the water flows from the top surface carrying the hulls and tip caps with it. The peeled kernels of corn, or aleurone coated endosperms, emerge from the bottom of the separator. A centrifugal machine with a flow of water opposing the radial centrifugal force could also be used.

The hulls and tip caps can then be separated from the accompanying flow of water by revolving or vibrating screens or a suitable filter. The effluent water can then be recirculated to the hydraulic separator for further use, thereby reducing the quantity of water needed.

The moist hulls and tip caps are useful as a component of the gluten feed, or they can be utilized as a source of cellulose or xylan.

The dehulled and decapped corn is next steeped to soften the endosperm cells so that the starch can be freed from the cells. Preferably, this is done by immersing the aleurone coated endosperms in water at a temperature of about 125° to 135° F., the water containing approximately 0.2 to 0.3 per cent of sulphur dioxide. Preferably, this water is circulated counter-current with respect to the corn so that the fresh water goes to the corn which is about ready to be removed from the steeps. In conventional operations, the steeping time required would be at least 36 to 40 hours. By means of the present invention, the dehulled and decapped corn requires a steeping time of only 10 to 16 hours.

The light steep water is concentrated in evaporators and can then be used for numerous other industrial applications, or it also can be added to the corn gluten feed.

The steeped dehulled and decapped corn is next degerminated by use of, for example, a Bauer or Foos mill. In the old process it would be necessary to use at least two of these mills because of the presence of the hulls and tip caps which interfere with the milling operation. Now, however, with a single mill the hull and tip-cap-free endosperms can be broken apart by means of the studded stationary and revolving plates of the mill and the embryos set free.

The mixture of broken endosperms and embryos are next fed to a separator consisting of a tank with a bottom discharge for the endosperm fraction and a paddle arrangement at the top to sweep off the germs which float upon the surface to be discharged over a weir. Any suitable type of separator can be used. As an aid to the flotation of the germs, it is best to increase the density of the flotation medium to approximately 8° Baumé by using a light mill starch suspension for this purpose.

The germs are next washed with water to free them of adhering starch. They are then dried and the oil is extracted or expelled.

The effluent from the bottom of the germ separator, which now consists almost entirely of endosperm particles, is next ground, for example, in a Buhr mill, or any suitable type of mill that will free the starch from the endosperm cells. Here the advantages of the present invention again are particularly significant. The endosperms being freed of the hulls and tip caps, and containing only the aleurone portions, permit a finer grinding operation than heretofore possible. It will be appreciated that in conventional processes the hull and tip caps which are present during the grinding of the endosperm tend to cushion the grinding action. By the elimination of these fractions the efficiency of the process is greatly enhanced.

Since the aleurone cells are highly suberized, they do not tend to be ground by the mill. The aleurone fragments can efficiently be separated and recovered by a reel or shaker having a 48 mesh per inch screen. The separate recovery of this fraction appears to be entirely novel in the industry.

The suspension which passes through the screens consists of starch, gluten, and the very thin endosperm cellulosic cell walls. This is next passed over a suitable silk shaker to remove the endosperm cell walls, termed fine grits. The starch-gluten suspension, termed mill starch, is next tabled or passed through a centrifuge and the starch and gluten separately recovered.

Among the advantages derived from the present invention, as applied to the wet milling process of corn, the following may be listed:

Greater yield of starch
Greater yield of oil
Reduced time required for steeping
Lower costs of manufacture
Recovery of a substantially pure aleurone fraction.

Dry milling process

In applying the principles of the present invention to the dry milling process, the corn is dehulled and decapped in the same manner as in the wet milling process. Referring to the flow sheet it will be seen that the only differences in the steps of the process are as indicated by the dotted line positions. This involves merely a conditioning step in place of the steeping step and the transposition of this latter step to a point in the process following the germ separation. The degermination and germ separation are not changed. In other words, the dehulled and decapped corn, which contains approximately 30 per cent moisture, is conditioned by storing it for a period of about 6 hours at room temperature, or for a period of approximately one-half hour at about 180° F. At the end of this conditioning step the corn is about properly temperated for the dry degermination step.

The degermination can be carried out in a Bauer mill or with a Beall degerminator similar to that used in conventional dry milling. Where a Bauer mill is used it is necessary to use a series of aspirators and roller mills to separate the germs and the endosperms.

Up to this point the process can also be used for the preparation of white goods, i. e. corn meal, corn flour, grits, etc. However, if it is desired to prepare starch beginning at this point, the ground endosperms with the accompanying aleurone portions are next steeped, for example, in dilute sulfurous acid or any alkali similar to that described under the wet milling process. Due to the small particle size of the endosperms the steeping time need only be approximately 4 hours and here, again, a distinct advantage appears. From this step in the process, the manufacture of starch, and the recovery of other by-products, proceeds as described in connection with the aforementioned wet milling process.

Among the advantages of the dry milling process of corn, the following may be listed:

Greater yield of oil
Greater yield of white goods
Reduction in the number of aspirators and mills required to obtain a substantially complete separation of embryo from hulls and endosperm
Reduction in the cost of manufacture.

It will thus be seen that the objects and advantages herein set forth may readily and efficiently be attained, and since certain changes may be made in carrying out the above processes without departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. In the process of manufacturing starch from corn kernels, the improvement which comprises immersing corn kernels in an aqueous caustic alkali solution of not less than 0.2 per cent concentration at a temperature in the range of 160° F. to 212° F. for a period of time not exceeding 15 minutes, thereby loosening only the hulls and tip caps of the kernels prior to their subsequent removal.

2. In the process of manufacturing starch from corn kernels, the improvement which comprises immersing corn kernels in an aqueous caustic alkali solution having an alkali concentration within the range of 0.5 per cent to 1.0 per cent at a temperature in the range of 160° F. to 212° F. for a period of time not exceeding 15 minutes, thereby loosening only the hulls and tip caps of the kernels prior to their subsequent removal.

3. In the process of manufacturing starch from corn kernels, the improvement which comprises immersing corn kernels in an aqueous caustic alkali solution of not less than 0.2 per cent concentration at a temperature in the range of 160° F. to 212° F. for a period of time of from 2 to 5 minutes, thereby loosening only the hulls and tip caps of the kernels prior to their subsequent removal.

4. In the process of manufacturing starch from corn kernels, the improvement which comprises immersing corn kernels in an aqueous caustic alkali solution having an alkali concentration of 0.5 per cent to 1.0 per cent at a temperature in the range of 160° F. to 212° F. for a period of time of from 2 to 5 minutes, thereby loosening only the hulls and tip caps of the kernels prior to their subsequent removal.

5. In the process of manufacturing starch from corn kernels, the improvement which comprises immersing corn kernels in an aqueous caustic alkali solution of not less than 0.2 per cent concentration at a temperature in the range of 180° F. to 200° F. for a period of time not exceeding 15 minutes, thereby loosening only the hulls and tip caps of the kernels prior to their subsequent removal.

DONALD W. HANSEN.

REFERENCES CITED

The following references are of record in the file of this patent:

UNITED STATES PATENTS

| Number | Name | Date |
|---|---|---|
| 22,460 | Stratton | Dec. 28, 1858 |
| 264,222 | Bartol | Sept. 2, 1882 |
| 280,044 | Kingsford | June 26, 1883 |
| 316,406 | Schuman | Apr. 21, 1885 |
| 318,308 | Schuman | May 18, 1885 |
| 320,400 | Schuman | June 16, 1885 |
| 2,192,212 | Wagner | Mar. 5, 1940 |
| 2,219,777 | Holloway | Oct. 29, 1940 |
| 2,284,239 | Wagner | May 26, 1942 |